United States Patent [19]
Hong

[11] Patent Number: 5,491,522
[45] Date of Patent: Feb. 13, 1996

[54] LUMINANCE AND COLOR SIGNAL ISOLATION DEVICE

[75] Inventor: Seong H. Hong, Seoul, Rep. of Korea

[73] Assignee: Goldstar Co., Ltd., Seoul, Rep. of Korea

[21] Appl. No.: 258,001

[22] Filed: Jun. 10, 1994

[30] Foreign Application Priority Data

Jun. 11, 1993 [KR] Rep. of Korea ................ 1993-10618

[51] Int. Cl.$^6$ .................................................. H04N 9/78
[52] U.S. Cl. .......................................... 348/663; 348/665
[58] Field of Search .................................... 348/663, 665; H04N 9/78

[56] References Cited

U.S. PATENT DOCUMENTS

| | | | |
|---|---|---|---|
| 4,489,346 | 12/1984 | Tanaka et al. | 348/664 |
| 5,249,040 | 9/1993 | Sugiyama | 348/663 |

FOREIGN PATENT DOCUMENTS

| | | | |
|---|---|---|---|
| 71288 | 3/1989 | Japan | H04N 9/78 |
| 93284 | 4/1989 | Japan | H04N 9/78 |
| 3293889 | 12/1991 | Japan | H04N 9/78 |
| 2241403 | 12/1990 | United Kingdom | H04N 9/78 |

*Primary Examiner*—James J. Groody
*Assistant Examiner*—Glenton B. Burgess
*Attorney, Agent, or Firm*—Spencer & Frank

[57] ABSTRACT

A luminance and color signal isolation device having a horizontal nonlinear luminance signal dector which is detecting a luminance signal from a synthesis picture signal as an input without having any change to the horizontal direction; and a vertical nonlinear luminance signal dector which is detecting the luminance signal with the synthesis picture signal as an input without having any change to the vertical direction. A color signal detector detects a color signal from the synthesis picture signal; and a delay device which delays the synthesis picture signal for a certain time in order to be in synchronism with the output signal of the color signal detector. A subtractor subtracts an output signal of the color signal detector from the output signal of the delay device; and a control signal generator detects any change of the synthesis picture signal to the vertical or horizontal direction and also generates control signals of CS11 and CS12. A multiplexer alternatively selects one of the luminance signal among the output signals from the subtractor, the detector of vertical nonlinear luminance signal, and the detector of horizontal nonlinear luminance signal using the control signals of CS11 and CS12 as the input signals from the control signal generator.

15 Claims, 8 Drawing Sheets

FIG.1
CONVENTIONAL ART

$C = \frac{1}{2}V_{12} - \frac{1}{4}(V_{11} + V_{14})$  $Y = \frac{1}{2}V_{12} + \frac{1}{4}(V_{11} + V_{13})$

FIG.2
CONVENTIONAL ART $C = \frac{1}{2}V_{22} - \frac{1}{4}(V_{21} + V_{23})$ $Y = \frac{1}{2}V_{22} + \frac{1}{4}(V_{21} + V_{23})$

| Y−I | Y−Q | Y−I | Y+Q | Y−I | Y−Q | LINE N−2 |
| * | * | * | * | * | * | |
| Y+I | Y+Q | Y−I | Y−Q | Y+I | Y+Q | LINE N−1 |
| * | * | * | * | * | * | |
|  |  |  | A4 |  |  |  |
| Y−I | Y−Q | Y+I | Y+Q | Y−I | Y−Q | LINE N |
| * | * | * | * | * | * | |
|  | A1 |  | A2 |  |  | |
| Y+I | Y+Q | Y−I | Y−Q | Y+I | Y+Q | LINE N+1 |
| * | * | * | * | * | * | |
|  |  |  | A5 |  |  | |
| Y−I | Y−Q | Y+I | Y+Q | Y−I | Y−Q | LINE N+2 |
| * | * | * | * | * | * | |

LUMINANCE AND COLOR SIGNAL ISOLATION DEVICE

FIELD OF THE INVENTION

This invention generally relates to the synthesis picture signal processing Device of a color Television, and more particularly, to the Luminance and Color Signal Isolation Device for the synthesis Picture Signal of the Guadrature modulated color Television.

BACKGROUND OF THE INVENTION

In order to use the limited frequency band more efficiently, the broadcasting method of the guadrature Modulated color Television is generally defined to transmit the synthesis Picture Signals resulted from interleaving the color signals onto the luminance signals so that the transmitted signals can be received by the Television Set and separated into the luminance signals and the color signals.

However, in the case that the above mentioned separation is imperfectly done by the color Television Set, the various phenomena deteriorating of the picture quality are supposedly shown up. For examples, the cross luminance phenomena such as all kinds of Dot interferences, the cross color phenomena such as spreading of the color signals and appearance of the rainbow patterns, and the resolution deteriorating phenomena of the luminance signals.

The following method has been commonly recognized as the one to prevent the picture quality from being deteriorated followed by the imperfect separation of the luminance signals and the color signals. That is to say, the color signal of the NTSC method color Television's synthesis picture signals is sampled by each line and by four times the sampling frequency of the color subcarrier's, and this sampled goes through to be filtered the band pass filter or the line com-filter, which has the characteristics of 180 phase reversal of the color signal in every to samples, so that the luminance signal and the color signal are separated. In the procedures of the above described, in order to prevent the resolution of the luminance signal from being deteriorated, the color signal is separated with the cascade of the band pass filter and the line com-filter.

The detail descriptions about this conventional art are given as follows using the block diagrams of FIG. 1, 2 and 3.

Figure 1:
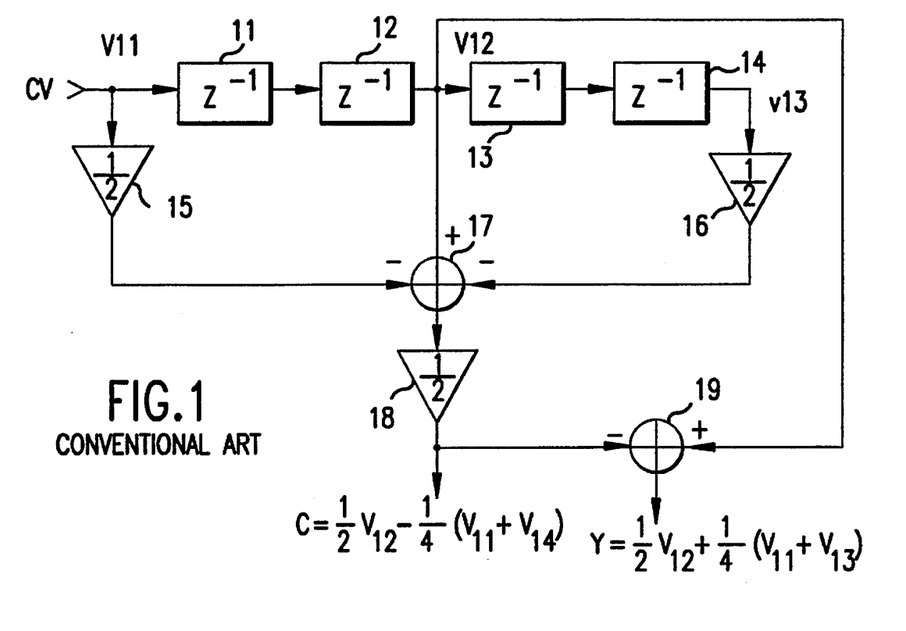
FIG. 1 is a block diagram which is required in order to separate the luminance signal and the color signal using the conventional band pass filter.

In the FIG. 1, which is the block diagram required in order to separate the luminance signal and the color signal using the conventional band pass filter, the synthesis picture signal as an input goes through the one sample delay devices of 11 and 12 so that it can be delayed the period of 2 samples. The delayed signal, which now has the delay of the period of 2 samples through the delay devices of 11 and 12, again goes through the one sample delay device of 13 and 14 so that the output signal "V13" can be delayed totally by the period of 4 samples. The initial synthesis picture signal "V11", which doesn't go through the delay devices 11 to 14, and the delayed signal "V13", which has the delay of the period of 4 samples, are respectively amplified through the ½ amplifiers of 15 and 16, so that the signals of V11/2 and V13/2 can be obtained.

The signal "V12", which has the delay of the period of 2 samples through the delay devices of 11 and 12, and the signals "½V11" and "V13/2", which are amplified through the ½ amplifiers of 15 and 16, go into the subtractor 17 as an input so that the output signal "V12–V11/2–V13/2" can be obtained after proceeding the subtraction procedures. The output of the said subtractor 17 is amplified by half time through the ½ amplifier 18, so that the color signal "C=½V12–¼(V11+V13)" can be obtained.

The color signal "C" coming out from the said ½ amplifier 18, and the delayed signal "V12" gone through the said one sample delay devices of 11 and 12, go into the subtractor 19 as an input.

In the said subtractor 19, the color signal "C" is subtracted from the signal "V12", which is delayed by the period of two samples, so that the luminance signal "Y=½V12+¼(V11+V12)" can be separated.

However, the method of separating the luminance signal and the color signal using the conventional art described as the above contains the problems in the case that there is any change to the horizontal direction in the synthesis picture signal, such as the cross luminance phenomena like Dot crawling, the spreading phenomena of the color signals, and the resolution deteriorating of the luminance signals.

Figure 2:
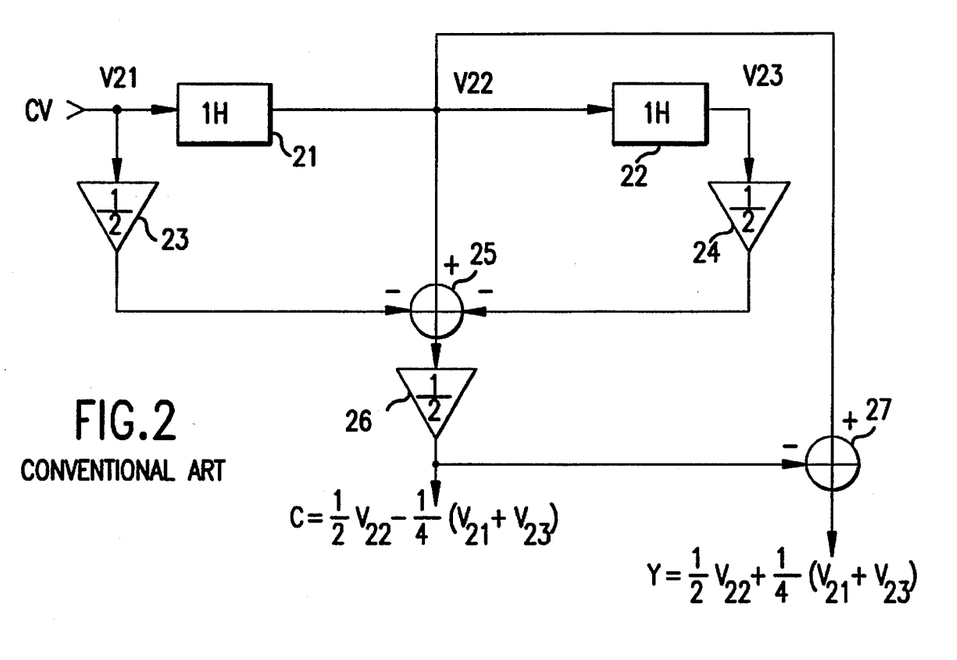
FIG.2 is a block diagram which is required in order to separate the luminance signal and the color signal using the conventional line com-filter.

In the FIG. 2, which is the block diagram required in order to separate the luminance signal and the color signal using the conventional line com-filter, the synthesis picture signal(CV) as an input, which is the non-delayed signal "V21", goes into respectively the delay device of 21, which delays one period of the horizontal synchronization signal, and the ½ amplifier of 23.

The delayed signal "V22", which was delayed by 1 H(H: a period of horizontal synchronization signal) through the said delay device of 21, goes into as an input the delay device of 22 and the subtracter of 25 and 27.

The signal delayed by 2 H through the said delay devices of 21 and 22 goes into as an input the subtracter of 25 after it was amplified by half time through the ½ amplifier of 24, and the signal "V21/2" amplified by ½ through the ½ amplifier of 23 goes into as an input the subtracter of 25 as well.

In the said subtracter of 25, the signal "½V21" non-delayed and amplified by ½, and the signal "½V23" delayed by 2 H and amplified by ½ are subtracted from the signal "V22" delayed by 1 H, so that the signal "V22–½V21–½V23" can be output to the ½ amplifier of 26.

The, next stage, said ½ amplifier of 26, amplifies the input signal "V22–V21/2–V23/2" by ½ and produces the color signal "C" of "½V22–¼(V21+V23)". The said color signal(C) and the signal "V22" delayed by 1 H are used as the input signals to the subtracter of 27, and the luminance signal(Y) "½V22+¼(V21+V23)" can be separated through subtracting the color signal(C) from the said signal "V22".

However, though the said described art is served to improve the resolution a little in comparison with the pre-described method of separating the luminance signal and the color signal using the band pass filter, still the overall resolution is lower than required and the problems so-called the cross luminance phenomena like hanging dot are involved with this method in the case that there is any change to the vertical direction in the synthesis picture signal.

Figure 3:
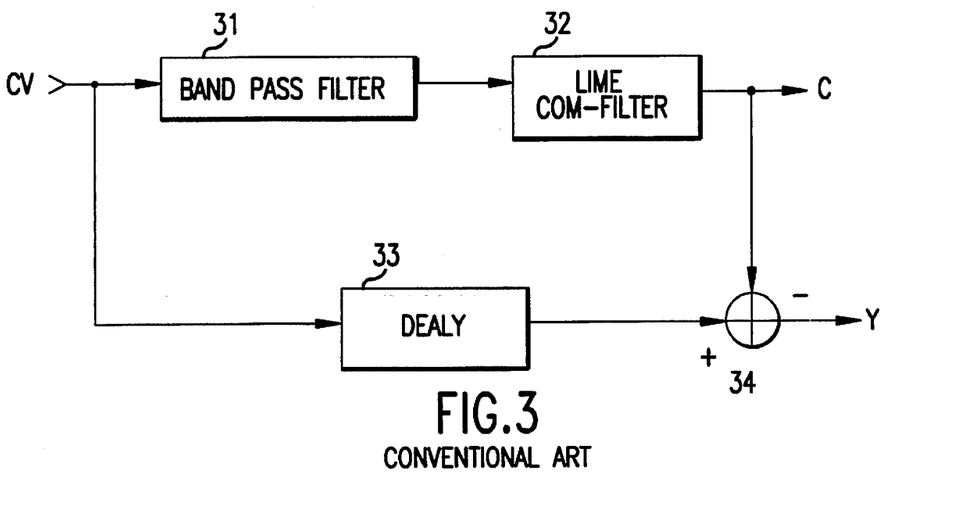
FIG.3 is a block diagram which is required in order to separate the luminance signal and the color signal using the conventional band pass filter and line com-filter.

In the attached FIG. 3, which is the block diagram required in order to separate the luminance signal and the color signal using the pre-described band pass filter and line com-filter, the color signal will be extracted by getting the synthesis picture signal(CV) passed through the band pass filter of 31 and the line com-filter of 32.

And the luminance signal can be obtained through primarily synchronizing the synthesis picture signal(CV), which get delayed by the delay of 33, with the color signal, and subtracting in the subtractor of 34 the color signal from the output signal of the delay of 33.

However, though the art, described on this time is served to improve greatly the resolution of luminance signal and has no cross color phenomena in comparison with the pre-described method of separating the luminance signal and the color signal using respectively the band pass filter and the com-filter, still the problems of having the dots are involved even with this method in the case that there is any change to the vertical or horizontal direction in the synthesis picture signal.

On the other hand, in the prior art of U.S. Pat. No. 4,864,389, the color signal is extracted by filtering the input synthesis picture signal and the delayed signal of the 1st, 2nd line of this input synthesis picture signal through the band pass filter, and then two values are compared, one of which is the value added the color signal of the one line delayed synthesis picture signal and the other added the color signal of the one and two lines delayed synthesis picture signal commonly to the color signal of the input synthesis picture signal.

From the above comparison result, using the smaller of two absolute values, the color signal is obtained by filtering through the 1 H line com-filter, and the luminance signal is obtained by subtracting the color signal from the synthesis picture signal synchronized by getting delayed. In this case, if the absolute value is lower than some assigned threshold level, the luminance signal and the color signal will be obtained by filtering through the 2 H line com-filter, but still the problems of having the dot crawling phenomena are involved even with this method, too, in the case that there is any change to the horizontal direction in the synthesis picture signal.

SUMMARY OF THE INVENTION

This invention aims at providing the Luminance and Color Signal Isolation Device to be able to achieve the accurate separation of the luminance signal and the color signal not to deteriorate the resolution and also preventing the cross color phenomena and the cross luminance phenomena as well.

The above goals including the other ones can be achieved by the Two dimensional Luminance and Color Signal Isolation Device for the synthesis Picture Signal of the Guadrature modulated color Television, which consists of several units such as the followings:

- a detector of the horizontal nonlinear luminance signal which is detecting the luminance signal with the synthesis picture signal as an input without having any change to the horizontal direction;
- a detector of the vertical nonlinear luminance signal which is detecting the luminance signal with the synthesis picture signal as an input without having any change to the vertical direction;
- a color signal detector which is detecting the color signal from the synthesis picture signal;
- a delay device which is delaying the synthesis picture signal for a certain time to get the synchronization with the output signal of the color signal detector;
- a subtractor which is subtracting the output signal of the color signal detector from the output signal of the delay device;
- a control signal generator which is both detecting the any change of the synthesis picture signal to the vertical or horizontal direction and also generating the control signals of CS11 and CS12;
- a multiplexer which is alternatively selecting one as the luminance signal among the output signals from the subtractor, the detector of vertical nonlinear luminance signal, and the detector of horizontal nonlinear luminance signal using the control signals of CS11 and CS12 as the input signals from the control signal generator; and
- a subtractor which is subtracting the output luminance signal of the multiplexer from the synthesis picture signal which is delayed and matched.

BRIEF DESCRIPTION OF THE DRAWINGS

FIG.4 1s a block diagram which is showing the total configuration of the Two dimensional Luminance and Color Signal Isolation Device regarding this invention.

(FIG. 9 is a wave diagrams which are describing the operation of the control signal generator unit, each of them is as follows;)

DETAILED DESCRIPTION OF THE INVENTION

Figure 4:
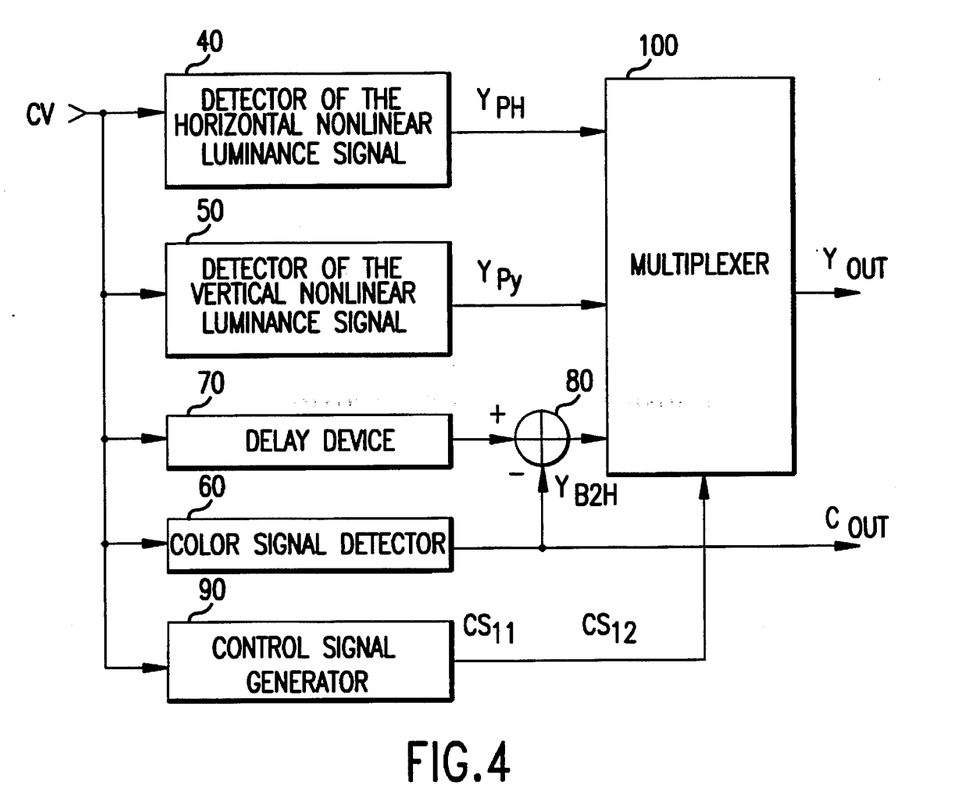

The FIG. 4, as shown on the block diagram which is showing the total configuration of the Two dimensional Luminance and Color Signal Isolation Device regarding this invention, consist of several units such as followings;

the detector "40" of the horizontal nonlinear luminance signal which is detecting accurately the luminance signal(Yph) in the case that the synthesis picture signal(CV) has no change to the horizontal direction, the detector "50" of the vertical nonlinear luminance signal which is detecting accurately the luminance signal(Ypv) in the case that the synthesis picture signal(CV) has no change to the horizontal direction the color signal detector "60" which is detecting the color signal(Cout) from the synthesis picture signal(CV), the delay device "70" which is delaying the synthesis picture signal(CV) for a certain time to get the synchronization with the output signal of the color signal detector "60", the subtractor "80" which is subtracting the output signal of the color signal detector "60" from the output signal of the delay device "70" and producing the luminance signal(Ybzh), the control signal generator "90" which is both detecting the any change of the synthesis picture signal(CV) to the vertical or horizontal direction and also generating the control signals of CS11 and CS12, the multiplexer "100" which is alternatively selecting one as the luminance signal(Yout) among the output signals from the subtractor "80", the detector of vertical nonlinear luminance signal "50", and the detector of horizontal nonlinear luminance signal "40" according to the control signals of CS11 and CS12 generating from the control signal generator "90".

The Two dimensional Luminance and Color Signal Isolation Device of this invention, which is described as the above, detects and produces each luminance signal(Yph)(Ypv) from the synthesis picture signal which is provided to the detector of vertical nonlinear luminance signal "50" and the detector of horizontal nonlinear luminance signal "40". In this case, if the synthesis picture signal (CV) has any change not to the horizontal direction but to the vertical direction, the horizontal nonlinear luminance detector "40" will detect accurately and produce the luminance signal (Yph). On the other hand, if the synthesis picture signal (CV) has any change not to the vertical direction but to the horizontal direction, the vertical nonlinear luminance detector "50" will detect accurately and produce the luminance signal (Ypv).

The detector of the color signal "60", just like the convention art illustrated on the above FIG. 3, detects the color signal(Cout) with the cascade of the band pass filter and the line com-filter, and the luminance signal(Ybzh) is detected in the subtractor "80" by subtracting the color signal(Cout) from the delayed synthesis picture signal(CV) at the delay device "70".

By the way, if the synthesis picture signal used as an input signal in order to detect the above luminance signal(Ybzh) has any change to the horizontal or the vertical direction, the dot pattern will be a little generated. However, because the luminance signal(Ybzh) and the color signal(Cout) are produced separately with the comparative accuracy in the case that the synthesis picture signal(CV) has a little change to the horizontal and the vertical direction, the resolution deteriorating of the luminance signal is very low and the generation probability of the cross color phenomena becomes much lower.

And the control signal generator "90" controls the multiplexer "100" by transmitting the control signals (CS11, CS12) to the multiplexer "100", which is based on the conclusion of the change amount to the horizontal and the vertical direction in the synthesis picture signal (CV).

The above method makes it possible to produce the output luminance signal(Yout) with selecting the luminance signal(Yph) which is detected by the detector of the horizontal nonlinear luminance signal "40" if there is any change not to the horizontal direction but to the vertical direction in the synthesis picture signal (CV).

And also it can produce the output luminance signal(Yout) with selecting the luminance signal(Yph) which is detected by the detector of the vertical nonlinear luminance signal "50" if there is any change not to the vertical direction but to the horizontal direction in the synthesis picture signal (CV).

In addition to that with this method, if there is any change or no change to both the vertical and horizontal direction, the output luminance signal(Yout) can be produced with selecting the luminance signal(Ybzh) coming out from the subtractor "80".

This invention described as the above is going to be explained in detail with referring to the FIG. 5 to 10.

Figure 5:
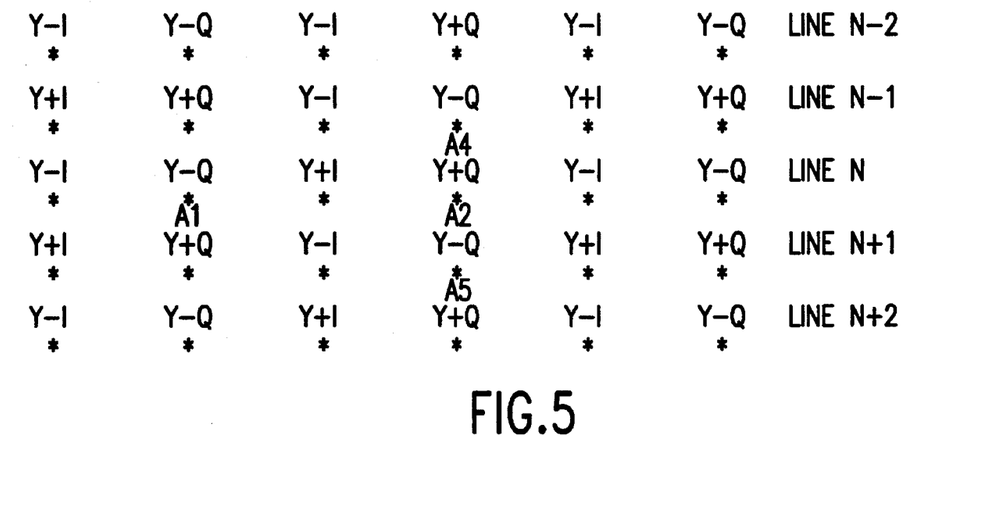
FIG. 5 is a the drawing which is showing the two dimensional data layout pattern of the synthesis picture signal for the general NTSC method's color television.

The FIG. 5 shows the two dimensional data layout pattern appearing when the synthesis picture signal for the general NTSC method's color television is sampled into 4 fsc, which is the frequency of the color subcarrier about 3.58 MHz, or 910 fH, which is the horizontal frequency of the scan line frequency about 15740 Hz. As recognized from the above drawing, the phase of the color signal(I or Q) is reversed at every two samples for the horizontal direction and at every line for the vertical direction. According to this two dimensional data layout pattern, the detectors "40" and "50" of the horizontal and the vertical nonlinear luminance signal detect the luminance signals (Yph) and (Ypv) with coprocessing both the specific synthesis picture signal and the other synthesis picture signal which is away two sample period and one line from the specific synthesis picture signal regarded as a basis. That is to say, the detector "40" of the horizontal nonlinear luminance signal utilizes the synthesis picture signal (A2) and the other synthesis picture signals (A1) and (A3) which are away two sample period from the synthesis picture signal(A2) to detect the luminance signal (Yph) for the synthesis picture signal (A2), and the detector "50" of the vertical nonlinear luminance signal utilizes the synthesis picture signal (A2) and the other synthesis picture signals (A4) and (A5) which are away one line from the synthesis picture signal(A2) to detect the luminance signal (Ypv) for the synthesis picture signal (A2).

Figure 6:
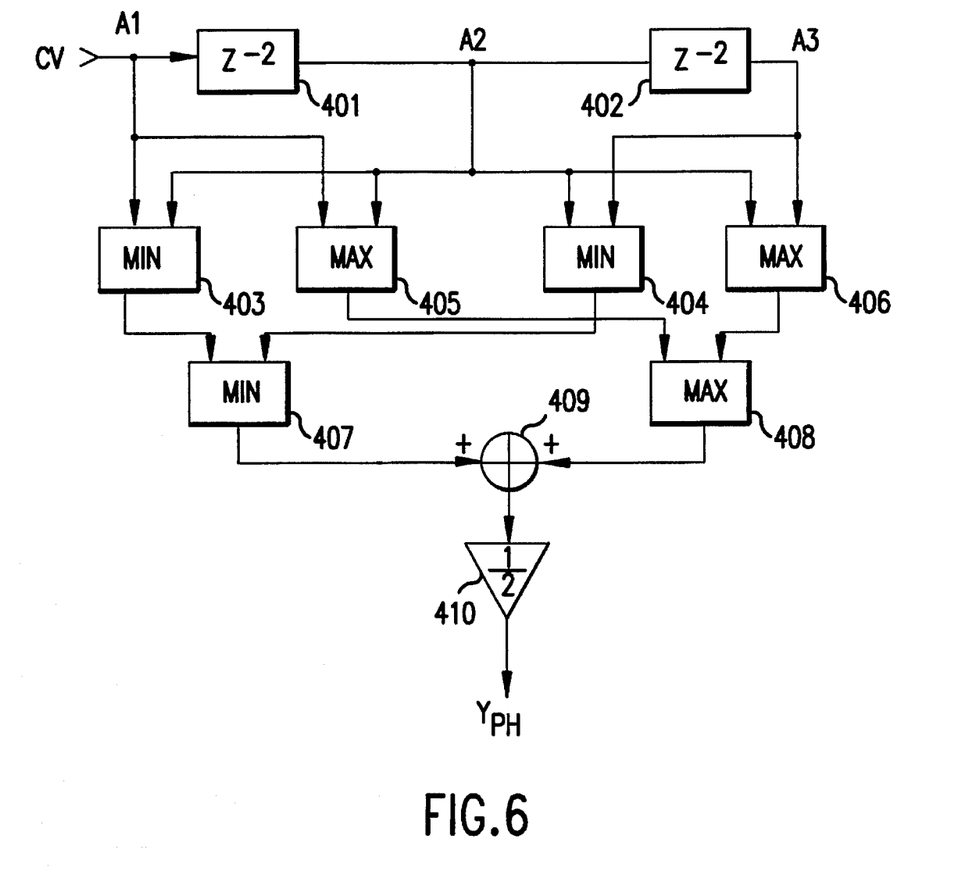
FIG. 6 is a the detail diagram which is showing the detector configuration of the horizontal direction's luminance signal regarding this invention.

The FIG. 6 is the detail diagram which is showing the detector "40" configuration of the horizontal direction's luminance signal. As illustrated on it, it consists of several units such as followings;

the two sample delay devices "401", "402" which delay the synthesis picture signal consecutively by two sample period, the minimum value detectors "403" which selectively detects the smaller signal of both the output signal (A2) of the said two sample delay device "401" and the synthesis picture signal(CV), and "404" which selectively detects the smaller signal of both the output signal (A3) of the said two sample delay device "402" and the output signal (A2) of the said two sample delay device "401", the maximum value detectors "405" which selectively detects the bigger signal both the output signal (A2) of the said two sample delay device "401" and the synthesis picture signal(CV), and "406" which selectively detects the bigger signal of both the output signal (A3) of the said two sample delay device "402" and the output signal (A2) of the said two sample delay device "401", the maximum value detector "407" which selectively detect the bigger signal of two output signals coming out from the said minimum value detector "403", "404", the minimum value detector "408" which selectively detect the smaller signal of two output signals coming out from the said minimum value detector "405", "406", the adder "409" which adds the output signals of the maximum value detector "407" and the minimum value detector "408", the amplifier "410" which produces the luminance signal(Yph) with amplifying by half time the output signal of the said adder "409".

The operation about the detector "40" of the horizontal direction's nonlinear luminance signal which is consisted of as the above described regarding this invention is going to be explained as follows;

The synthesis picture signal(CV) as an input signal is delayed by two sample period through passing consecutively the two sample delay devices "401", "402". In another words, in the case of taking as a basis the synthesis picture signal(A2) coming out from the two sample delay device "401", the synthesis picture signal (A3) coming out from the two sample delay device "402" becomes delayed by the two sample period against the synthesis picture signal (A2), and the current input synthesis picture signal(A1) becomes ahead of the synthesis picture signal(A2) by two sample period.

The synthesis picture signal (A2) coming out from the two sample delay device "401" goes into the minimum value detectors "403", "404" and the maximum value detectors "405", "406" where the synthesis picture signals (A1), (A3) does, too. From there, the smaller signals from the minimum value detectors "403", "404" and the bigger signals from the maximum value detectors "405", "406" are respectively produced. The bigger signal of the input signals to the maximum value detector "407", which are coming out from the minimum value detectors "403", "404", is selectively produced by the maximum value detector "407" and goes into the adder "409". The smaller signal of the input signals to the minimum value detector "408", which are coming out from the minimum value detectors "405", "406", is selectively produced by the minimum value detector "408" and goes into the adder "409" as well.

The said adder "409" adds the input signals together and sends it to the ½ amplifier "410", and consequently the said ½ amplifier "410" amplifies the input signal by half time and produces the luminance signal (Yph) shown as the following equation (1).

In the above procedure of signal processing, if there is no change to the horizontal direction in the synthesis picture signal (CV), the luminance signal (Yph) can be accurately separated.

$$Yph=\{MAX(MIN(A1,A2),MIN(A2,A3))+MIN(MAX(A1,A2),MAX(A2,A3))\}/2 \qquad (1)$$

Where,

MAX(,) stands for the bigger value of two values,

MIN(,) stands for the smaller value of two values.

Figure 7:
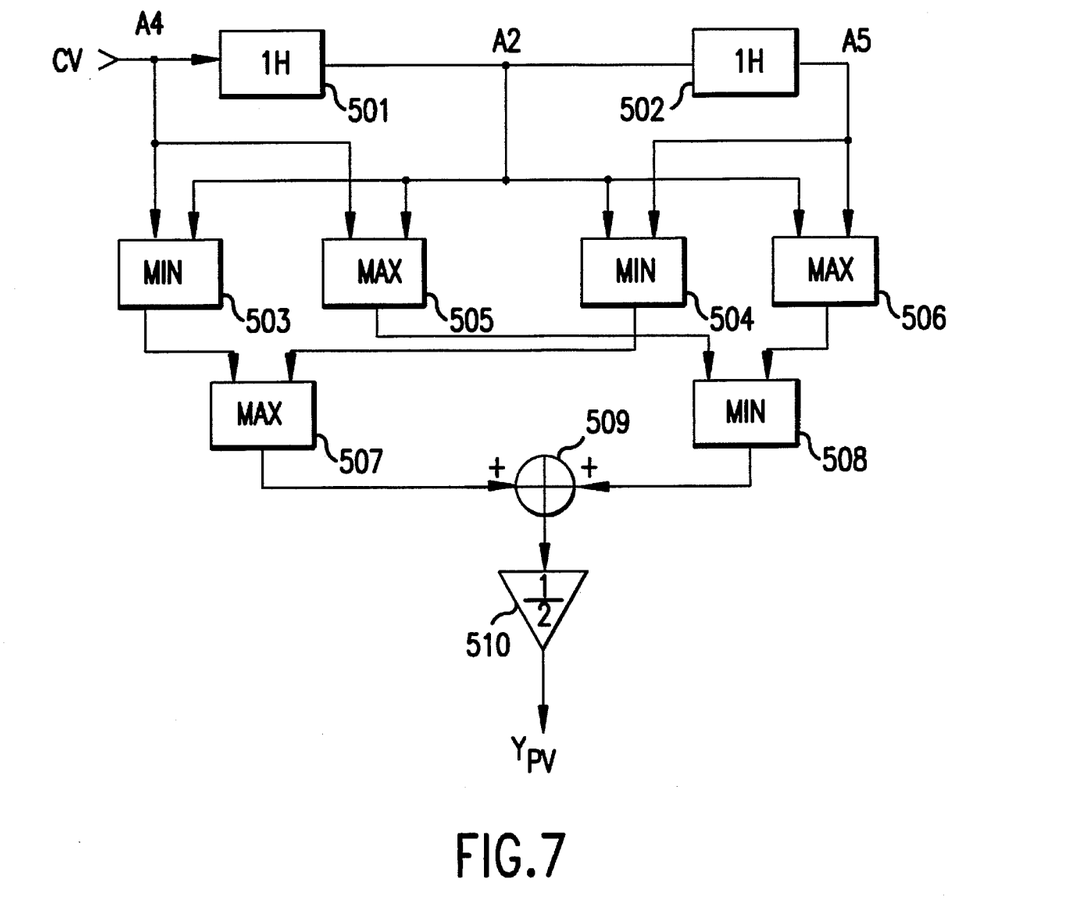
FIG.7 is a the detail diagram which is showing the detector configuration of the vertical direction's luminance signal regarding this invention.

The FIG. 7 is the detail diagram which is showing the detector configuration of the vertical direction's luminance signal regarding this invention. As illustrated on it, it consists of several units such as followings;

the one line delay devices "501", "502" which delay the synthesis picture signal (CV) consecutively by one line, the minimum value detectors "503" which selectively detects the smaller signal of both the output signal (A2) of the said one line delay device "501" and the non-delayed synthesis picture signal (A4), and "504" which selectively detects the smaller signal of both the output signal (A5) of the said one line delay device "502" and the output signal (A2) of the said one line delay device "501", the maximum value detectors "505", "506" which selectively produce the bigger signal of two input signals, the maximum value detector "507" which selectively produces the bigger signal of two output signals coming out from the said minimum value detector "503", "504", the minimum value detector "508" which selectively detect the smaller signal of two output signals coming out from the said minimum value detector "505", "506", the adder "509" which adds the output signals of the maximum value detector "507" and the minimum value detector "508", the amplifier "510" which produces the luminance signal (Ypv) with amplifying by half time the output signal of the said adder "509". The operation about the detector "50" of the vertical direction's nonlinear luminance signal which is consisted of as the above described regarding this invention is going to be explained as follows; The synthesis picture signal (CV) as an input signal is delayed by one line period through passing consecutively the one line delay devices "501", "502".

In another words, in the case of taking as a basis the synthesis picture signal (A2) coming out from the one line delay device "501", the synthesis picture signal (A5) coming out from the one line delay device "502" becomes delayed by the one line period against the synthesis picture signal (A2), and the current input synthesis picture signal (A4) becomes ahead of the synthesis picture signal (A2) by one line period.

The synthesis picture signal (A2) coming out from the one line delay device "501" and the synthesis picture signals (A4), (A5) are processed as like the same processing sequence for the said detector "40" of the horizontal direction's luminance signal, which gets through the minimum value detectors "503", "504", "508", the maximum value detectors "505~507", the adder "509" and the ½ amplifier, and finally produces the luminance signal (Ypv) shown as the following equation (2).

In the above procedure of signal processing, if there is no change to the vertical direction in the synthesis picture signal (CV), the luminance signal (Ypv) can be accurately separated.

$$Ypv=\{MAX(MIN(A4,A2),MIN(A2,A5))+MIN(MAX(A4,A2),MAX(A2,A5))\}/2 \qquad (2)$$

Figure 8:
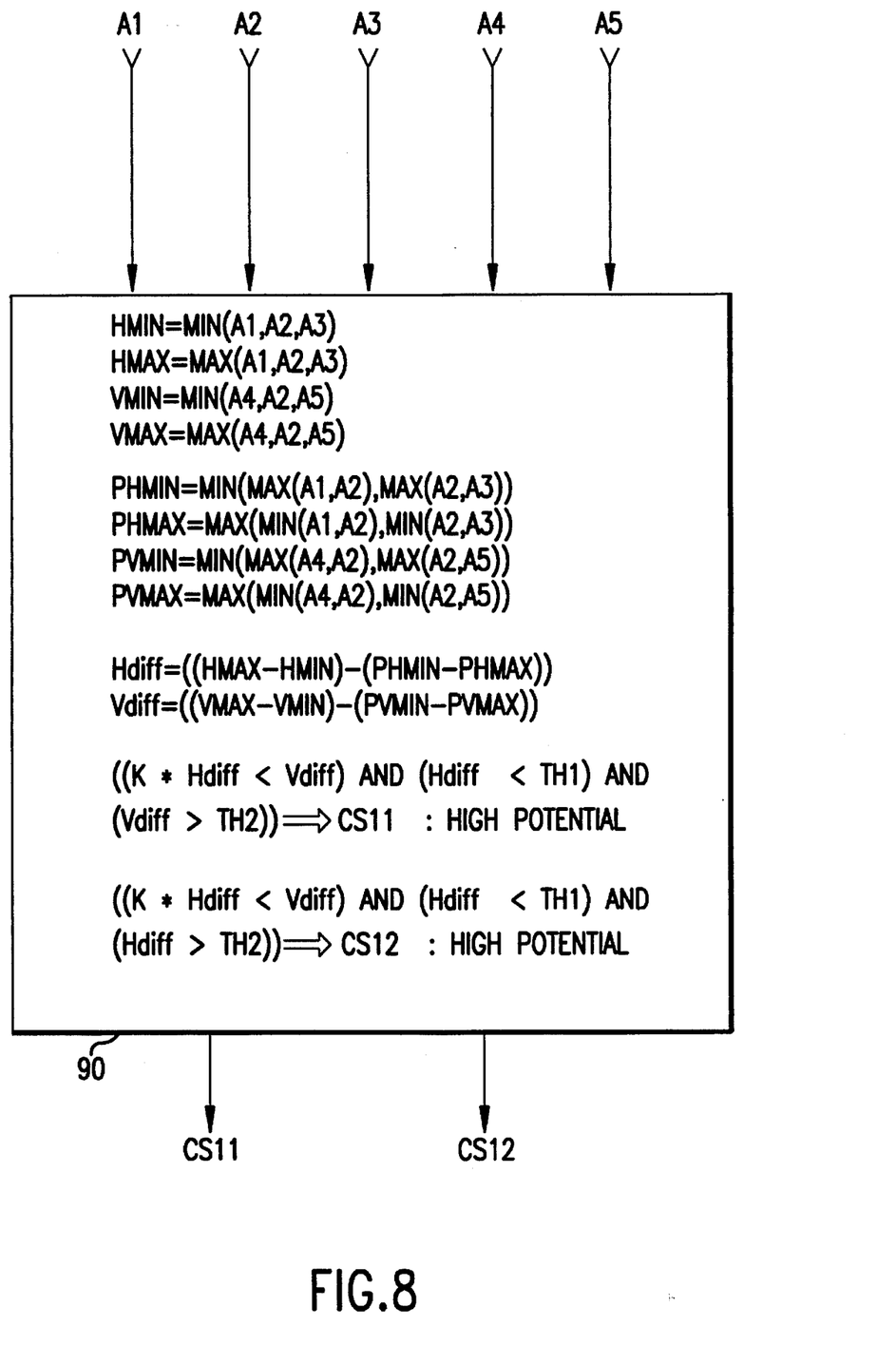
FIG.8 is a the drawing which is showing the processing procedure of the control signal generator unit regarding this invention.

The FIG. 8 is the drawing which is showing the processing procedure of the control signal generator unit "90" regarding this invention. As illustrated on it, the control signal generator unit "90" utilizes the fact that, in the case of a little horizontal change, the value of HMAX-HMIN for the synthesis picture signals (A1,A2,A3) of the horizontal factor and that of $$(PHMIN-PHMAX)=\{MIN(MAX(A1,A2),MAX(A2,A3))-MAX(MIN(A1,A2),MIN(A2,A3))\}$$

are almost same, and also in the case of the a little vertical change, the value of VMAX−VMIN for the synthesis picture signals (A4,A2,A5) of the vertical factor and that of $$(PVMIN-PVMAX)=\{MIN(MAX(A4,A2),MAX(A2,A5))-MAX(MIN(A4,A2),MIN(A2,A5))\}$$

are almost same. On the basis of the above fact, if the following equation (3) is satisfactory, the control signal generator unit generates the control signal (CS11) with high volts so that the multiplexer "100" can select the luminance signal (Yph) of the detector 40 of the horizontal direction's nonlinear luminance signal and produce the output signal (Yout) from it. By the way, if the following equation (4) is satisfactory, the control signal generator unit generates the control signal (CS12) with high volts so that the multiplexer 100 can select the luminance signal (Ypv) of the detector 50 of the vertical direction's nonlinear luminance signal and produce the output signal (Yout) from it. If both the equation (3) and (4) are not satisfactory, the control signal generator unit generates the control signals (CS11,CS12) with low volts so that the multiplexer 100 can select the luminance signal (Ybzh) of the subtractor 80 and produce the output signal (Your) from it.

$$K \cdot Hdiff < Vdiff \text{ and } Hdiff < TH1 \text{ and } Vdiff > TH2 \quad (3)$$

$$K \cdot Vdiff < Hdiff \text{ and } Vdiff < TH1 \text{ and } Hdiff > TH2 \quad (4)$$

Where,

K is a constant and K>1,

Hdiff stands for $$(MMAX-HMIN)-(PHMIN-PHMAX)=\{(MAX(A1,A2,A3)-MIN(A1,A2,A3)\}-\{MIN(MAX(A1,A2),MAX(A2,A3)-MAX(MIN(A1,A2),MIN(A2,A3))\},$$

Vdiff stands for $$(VMAX-VMIN)-(PVMIN-PVMAX)=\{(MAX(A4,A2,A5)-MIN(A4,A2,A5)\}-\{MIN(MAX(A4,A2),MAX(A2,A5)-MAX(MIN(A4,A2),MIN(A2,A5))\},$$

TH1 and TH2 are the threshold values assigned in advance.

Figure 9A:
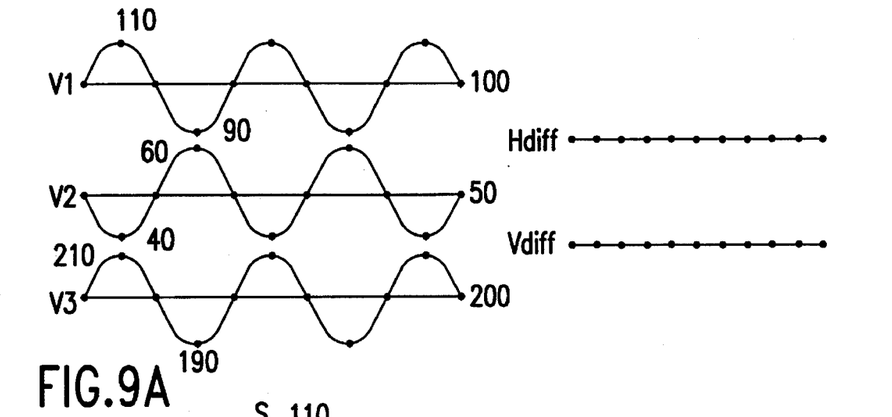
FIG.9A : the wave diagram in the case that the synthesis picture signal is changed to the vertical direction.
Figure 9B:
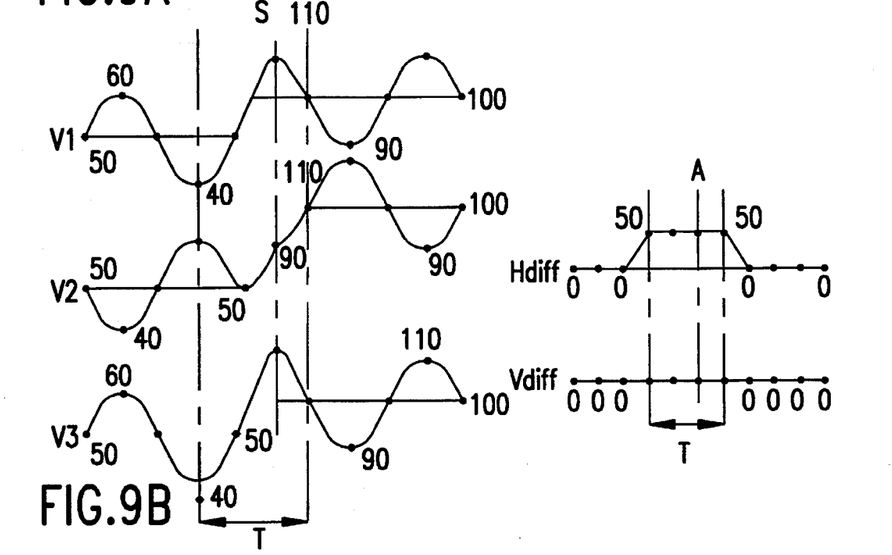
FIG. 9B : the wave diagram in the case that the synthesis picture signal is changed to the horizontal direction.
Figure 9C:
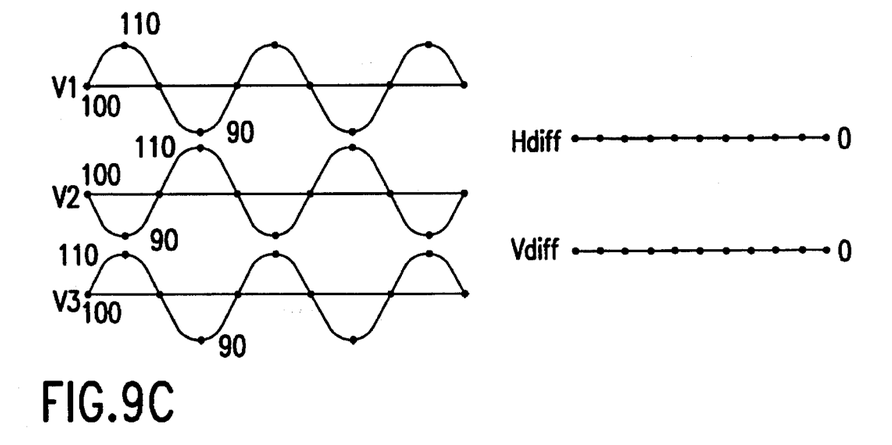
FIG.9C : the wave diagram in the case that there is no change in the synthesis picture signal to either the vertical or the horizontal direction.

FIG. 9 has 3 wave diagrams which are describing the operation of the control signal generator unit, each of them is as follows;

(A): the wave diagram shows the case that the synthesis picture signals (V1,V2,V3), of which the luminance factors are 100, 50 and 20 respectively and of which the color signal's level is 10, is changed to the vertical direction. In the above case, Hdiff for the synthesis picture signal (V2) is 0, and Vdiff is 100.

Therefore the control signal generator "90" generates the control signal (CS11) with high volts and the other control signal (CS12) with low volts so that the multiplexer "100" can select the luminance signal Yph) of the detector "40" of the horizontal direction's nonlinear luminance signal and produce the output signal (Yout) from it.

(B): the wave diagram shows the case that the synthesis picture signals (V1,V2,V31, of which the luminance factors are changed from 50 to 100 at the specific position(S) respectively and of which the color signal's level is kept to be 10, is changed to the horizontal direction. In the above case, Hdiff for the synthesis picture signal (V2) is 50, and Vdiff is 0.

Therefore the control signal generator "90" generates the control signal (CS12) with high volts and the other control signal (CS11) with low volts at the area(T) including the specific position(S) so that the multiplexer "100" can select the output signal (Ypv) of the detector "50" of the vertical direction's nonlinear luminance signal and produce the output signal (Yout) from it. And because both Hdiff and Vdiff are all 0 in the other area except the T area, the control signals (CS11,CS12) are generated with low volts so that the multiplexer "100" can select the luminance signal (Ybzh) of the adder "80" and produce the output signal (Yout) from it.

(C): the wave diagram shows the case that there is no change in the synthesis picture signals (V1,V2,V3) to either the vertical or the horizontal direction.

With 0 value for Hdiff and Vdiff, the control signals (CS11,CS12) are generated with low volts so that the multiplexer "100" can select the luminance signal (Ybzh) of the subtractor "80" and produce the output signal (Yout) from it.

Figure 10:
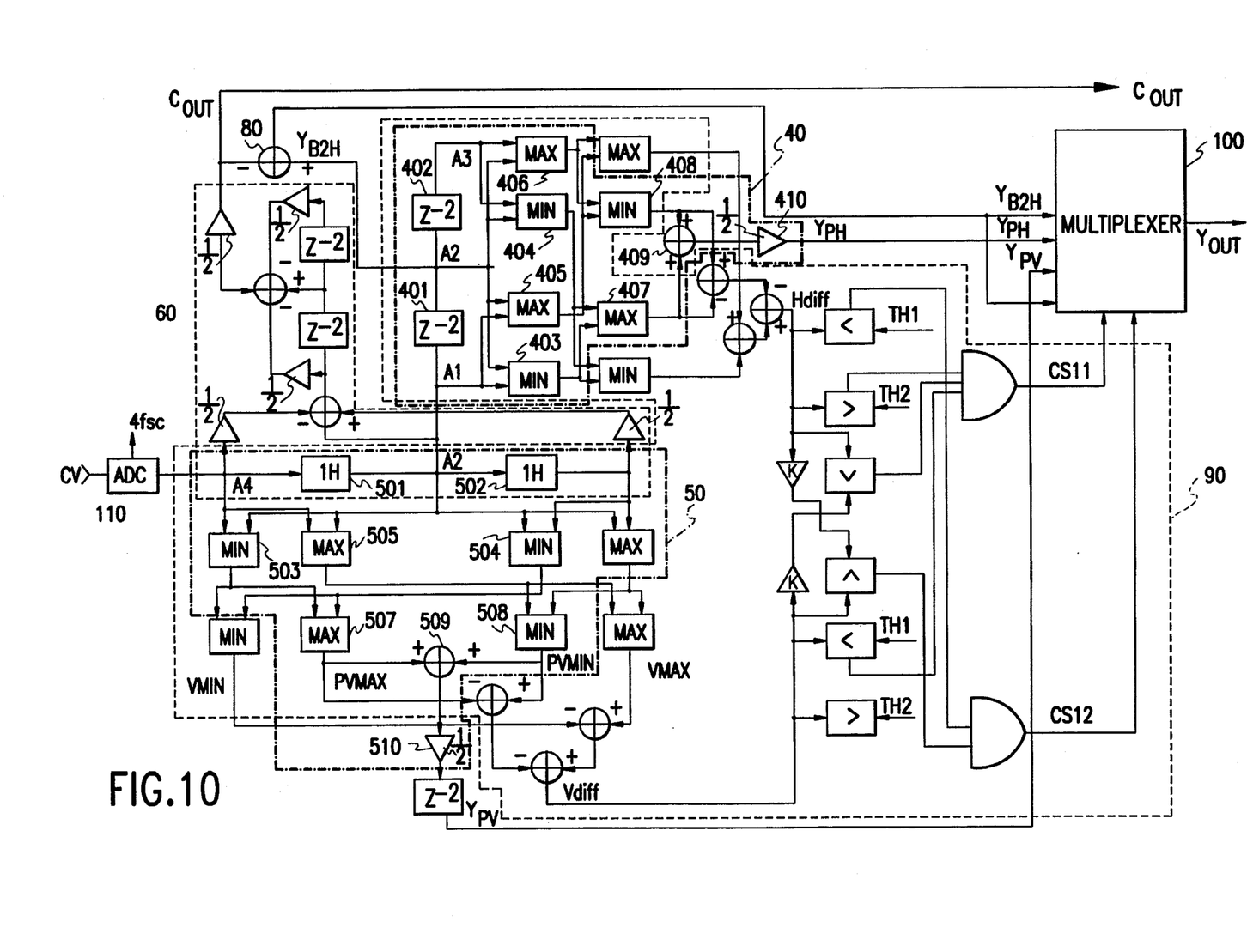
FIG. 10 is a detail drawing which is showing the total configuration of the Two dimensional Luminance and Color Signal Isolation Device regarding this invention.

As the above described, the two dimensional luminance and color signal isolation device regarding this invention can consist of independently each unit such as the detector "40" of the horizontal direction's nonlinear luminance signal, the detector "50" of the vertical direction's nonlinear luminance signal, the detector "60" of the color signal, the delay device "70", the subtractor "80", the control signal generator "90" and the multiplexer "100", and also as illustrated on the FIG. 10, it can consist of in common with the common units.

FIG. 10 shows the detail drawing where the luminance signal (Yout) and the color signal (Cout) are separated and produced through sampling the synthesis picture signal (CV) into 4 fsc by the analog/digital converter "110".

Figure 11:
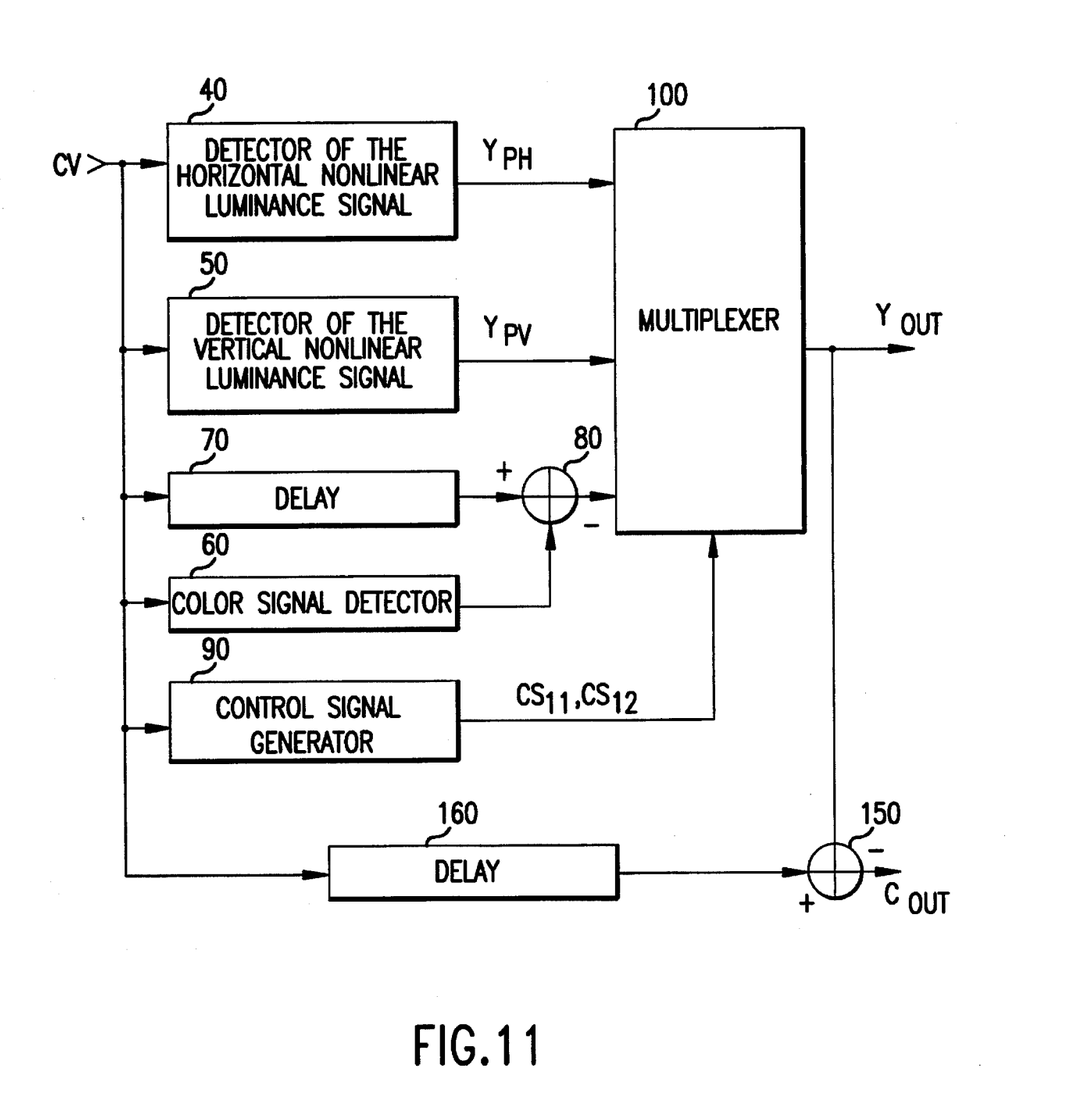
FIG. 11 is a block diagram which is showing the other illustration of the Two dimensional Luminance and Color Signal Isolation Device regarding this invention.

On the other hand, FIG. 11 is the block diagram which is showing the other illustration of the Two dimensional Luminance and Color Signal Isolation Device regarding this invention. As illustrated on it, it consists of several units such as followings;

the detector "40" of the horizontal direction's nonlinear luminance signal in the synthesis picture signal (CV), the detector "50" of the vertical direction's nonlinear luminance signal, and the subtractor "80", the multiplexer "100" which, according to the control of the control signal generator "90", produces the luminance signal (Yout) from the output signals coming out from the said 3 units "40", "50", "80", the subtractor "150" which produces the color signal (Cout) having the value that resulted from subtracting the luminance signal (Yout) from the delayed matching(160) synthesis picture signal (CV).

The other illustration of the Two dimensional Luminance and Color Signal Isolation Device regarding this invention, composed as the above described, detects accurately and produces the color signal as well as the luminance signal. For examples, in the case that the synthesis picture signal (CV) has change not to the horizontal direction but to the vertical direction, the subtractor "150" detects accurately the color signal (Cph) by subtracting the luminance signal (Yph), which is detected accurately by the detector "40" of the horizontal direction's nonlinear luminance signal, from the synthesis picture signal (CV), and in the case that the synthesis picture signal (CV) has change not to the vertical direction but to the horizontal direction, the subtractor "150" detects accurately the color signal (Cpv) by subtracting the luminance signal (Ypv), which is detected accurately by the detector "50" of the vertical direction's nonlinear luminance signal, from the synthesis picture signal (CV), and in the case that the synthesis picture signal (CV) has no change to the vertical direction and to the horizontal direction, the subtractor "150" detects and produces accurately the color signal (Cbzh) by subtracting the luminance signal (Ybsh) of the subtractor "80" from the synthesis picture signal (CV).

As like the above described, this invention makes it possible to detect several color signals and luminance signals according to the direction of the synthesis picture signal, and to suppress the appearance of the cross luminance phenomena and the cross color phenomena with selectively producing one signal among several luminance signals and color signals according to the changed amount to each direction of the synthesis picture signal, and to prevent the resolution from deteriorating.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A luminance and color signal isolation device, comprising:

a detector of a horizontal nonlinear luminance signal which is detecting a luminance signal from a synthesis picture signal as an input without having any change to horizontal direction; said detector of the horizontal direction nonlinear luminance signal detecting the luminance signal (Yph) using the following equation:

$$Yph=\{MAX(MIN(A1,A2),MIN(A2,A3))+MIN(MAX(A1,A2), MAX(A2,A3))\}/2$$

where,
MAX(,)=the bigger value of two values;
MIN(,)=the smaller value of two values; and
A1,A2,A3=the synthesis signals, and A2 is the basis, A1 is ahead of by two sample period, A3 is delayed by two sample period;

a detector of a vertical nonlinear luminance signal which is detecting the luminance signal with the synthesis picture signal as an input without having any change to vertical direction; said detector of the vertical direction nonlinear luminance signal detecting the luminance signal (Ypv) using the following equation:

$$Yph=\{MAX(MIN(A4,A2),MIN(A2,A5))+MIN(MAX(A4,A2), MAX(A2,A5))\}/2$$

where,
MAX(,)=the bigger value of two values;
MIN(,)=the smaller value of two values; and
A1,A2,A3=the synthesis signals, and A2 is the basis, A1 is ahead of by one line period, A3 is delayed by one line period;

a color signal detector which is detecting a color signal from the synthesis picture signal;

a delay device which is delaying the synthesis picture signal for a certain time in order to be in synchronism with the output signal of the color signal detector;

a subtractor which is subtracting an output signal of the color signal detector from the output signal of the delay device;

a control signal generator which is both detecting any change of the synthesis picture signal in both the vertical direction or horizontal direction and generating control signals of CS11 and CS12; and a multiplexer which is alternatively selecting one of the luminance signal among the output signals from said subtractor, said detector of vertical nonlinear luminance signal, and said detector of horizontal nonlinear luminance signal using the control signals of CS11 and CS12 as the input signals from the control signal generator.

2. The device according to claim 1, wherein said detector of the horizontal direction nonlinear luminance signal includes:

first sample delay device which delays synthesis picture signal (CV) by two sample period;

second sample delay device which delays the output signal of said first sample delay device by two sample period;

first minimum value detector which selectively detects the smaller signal of both the output signal of said first sample delay device and the synthesis picture signal (CV);

second minimum value detector which selectively detects the smaller signal of both the output signal of said first sample delay device and the output signal of said second sample delay device;

first maximum value detector which selectively detects the bigger signal of both the output signal of said first sample delay device and the synthesis picture signal;

second maximum value detector which selectively detects the bigger signal of both the output signal of said first sample delay device and the output signal of said second sample delay device;

third maximum value detector which selectively detects the bigger signal of two output signals coming out from said first and second minimum value detectors;

third minimum value detector which selectively detects the smaller signal of two output signals coming out from said first and second maximum value detectors;

an adder which adds the output signals of said third maximum value detector and said third minimum value detector;

an amplifier which amplifies the output signal of said adder by half amplification.

3. The device according to claim 1, wherein said detector of the horizontal direction nonlinear luminance signal includes:

first line delay device which delays the synthesis picture signal (CV) by one line period;

second line delay device which delays the output signal of said first line delay device by one line period;

first minimum value detector which selectively detects the smaller signal of both the output signal of said first line delay device and nondelayed synthesis picture signal;

second minimum value detector which selectively detects the smaller signal of both the output signal of said first line delay device and the output signal of said second line delay device;

first maximum value detector which selectively detects the bigger signal of both the output signal of said first line delay device and the nondelayed synthesis picture signal;

second maximum value detector which selectively detects the bigger signal of both the output signal of said first line delay device and the output signal of the second line delay device;

third maximum value detector which selectively detects the bigger signal of two output signals coming out from said first and second minimum value detectors;

third minimum value detector which selectively detects the smaller signal of two output signals coming out from said first and second maximum value detectors;

an adder which adds the output signals of said third maximum value detector and the third minimum value detector; and an amplifier which amplifies the output signal of said adder by half amplification.

4. The devise according to claim 1, wherein said color signal detector detects the color signal with a cascade of a band pass filter and a line comb-filter.

5. The device according to claim 1, wherein said control signal generator controls said multiplexer to select the luminance of the detector of the horizontal direction nonlinear luminance signal if the following equation (III) is satisfactory:

$$K \cdot Hdiff < Vdiff \text{ and } Hdiff < TH1 \text{ and } Vdiff > TH2 \quad (III)$$

Where,

K is a constant and K>1,

Hdiff stands for $$(HMAX-HMIN)-(PHMIN-PHMAX)=\{(MAX(A1,A2,A3)-MIN(A1,A2,A3)\}-\{MIN(MAX(A1,A2),MAX(A2,A3)-MAX(MIN(A1,A2),MIN(A2,A3))\},$$

Vdiff stands for $$(VMAX-VMIN)-(PVMIN-PVMAX)=\{(MAX(A4,A2,A5)-MIN(A4,A2,A5)\}-\{MIN(MAX(A4,A2),MAX(A2,A5)-MAX(MIN(A4,A2),MIN(A2,A5))\},$$

TH1 and TH2 are the threshold values assigned in advance,

MAX(,) stands for the bigger value of two values,

MIN(,) stands for the smaller value of two values.

6. The device according to claim 1, wherein said control signal generator controls the multiplexer to select the luminance signal of the detector of the vertical direction nonlinear luminance signal if the following equation (IV) is satisfactory:

$$K \cdot Vdiff < Hdiff \text{ and } Vdiff < TH1 \text{ and } Hdiff > TH2 \quad (IV)$$

Where,

K is a constant and K>1,

Hdiff stands for $$(HMAX-HMIN)-(PHMIN-PHMAX)=\{(MAX(A1,A2,A3)-MIN(A1,A2,A3)\}-\{MIN(MAX(A1,A2),MAX(A2,A3)-MAX(MIN(A1,A2),MIN(A2,A3))\},$$

Vdiff stands for $$(VMAX-VMIN)-(PVMIN-PVMAX)=\{(MAX(A4,A2,A5)-MIN(A4,A2,A5)\}-\{MIN(MAX(A4,A2),MAX(A2,A5)-MAX(MIN(A4,A2),MIN(A2,A5))\},$$

TH1 and TH2 are the threshold values assigned in advance,

MAX(,) stands for the bigger value of two values,

MIN(,) stands for the smaller value of two values.

7. The device according to claim 1, wherein said control signal generator controls the multiplexer to select the luminance signal of the subtractor if the following equations (V) and (VI) are not satisfactory:

$$K \cdot Hdiff < Vdiff \text{ and } Hdiff < TH1 \text{ and } Vdiff > TH2 \quad (V)$$

$$K \cdot Vdiff < Hdiff \text{ and } Vdiff < TH1 \text{ and } Hdiff > TH2 \quad (VI)$$

Where,

K is a constant and K>1,

Hdiff stands for $$(HMAX-HMIN)-(PHMIN-PHMAX)=\{(MAX(A1,A2,A3)-MIN(A1,A2,A3)\}-\{MIN(MAX(A1,A2), MAX(A2,A3)-MAX(MIN(A1,A2),MIN(A2,A3))\},$$

Vdiff stands for $$(VMAX-VMIN)-(PVMIN-PVMAX)=\{(MAX(A4,A2,A5)-MIN(A4,A2,A5)\}-\{MIN(MAX(A4,A2),MAX(A2,A5)-MAX(MIN(A4,A2),MIN(A2,A5))\},$$

TH1 and TH2 are the threshold values assigned in advance,

MAX(,) stands for the bigger value of two values,

MIN(,) stands for the smaller value of two values.

8. A luminance and color signal isolation device, comprising:

a detector of a horizontal nonlinear luminance signal which is detecting a luminance signal from a synthesis picture signal as an input without having any change to horizontal direction; said detector of the horizontal direction nonlinear luminance signal detecting the luminance signal (Yph) using the following equation:

$$Yph=\{MAX(MIN(A1,A2),MIN(A2,A3))+MIN(MAXA1,A2), MAX(A2,A3))\}/2$$

where,

MAX(,)=the bigger value of two values;

MIN(,)=the smaller value of two values; and

A1,A2,A3=the synthesis signals, and A2 is the basis, A1 is ahead of by two sample period, A3 is delayed by two sample period;

a detector of a vertical nonlinear luminance signal which is detecting the luminance signal with the synthesis picture signal as an input without having any change to vertical direction; said detector of the vertical direction nonlinear luminance signal detecting the luminance signal (Ypv) using the following equation:

$$Yph=\{MAX(MIN(A4,A2),MIN(A2,A5))+MIN(MAX(A4,A2), MAX(A2,A5))\}/2$$

where,

MAX(,)=the bigger value of two values;

MIN(,)=the smaller value of two values; and

A1,A2,A3=the synthesis signals, and A2 is the basis, A1 is ahead of by one line period, A3 is delayed by one line period;

a color signal detector which is detecting a color signal from the synthesis picture signal;

a delay device which is delaying the synthesis picture signal for a certain time in order to be in synchronism with the output signal of the color signal detector;

a subtractor which is subtracting the output signal of the color signal detector from the output signal of the delay device;

a control signal generator which is both detecting any change of the synthesis picture signal in both the vertical direction or horizontal direction and generating the control signals of CS11 and CS12;

a multiplexer which is alternatively selecting one as the luminance signal among the output signals from the subtractor, the detector of vertical nonlinear luminance signal, and the detector of horizontal nonlinear luminance signal using the control signals of CS11 and CS12 as the input signals from the control signal generator; and a subtractor which is subtracting the output luminance signal of the multiplexer from the synthesis picture signal which is delayed and matched.

9. The device according to claim 8, wherein said detector of the horizontal direction nonlinear luminance signal includes:

first sample delay device which delays the synthesis picture signal (CV) by two sample period;

second sample delay device which delays the output signal of said first sample delay device by two sample period;

first minimum value detector which selectively detects the smaller signal of both the output signal of said first sample delay device and the synthesis picture signal (CV);

second minimum value detector which selectively detects the smaller signal of both the output signal of said first sample delay device and the output signal of the said second sample delay device;

first maximum value detector which selectively detects the bigger signal of both the output signal of said first sample delay device and the synthesis picture signal;

second maximum value detector which selectively detects the bigger signal of both the output signal of said first sample delay device and the output signal of said second sample delay device;

third maximum value detector which selectively detects the bigger signal of two output signals coming out from said first and second minimum value detectors;

third minimum value detector which selectively detects the smaller signal of two output signals coming out from said first and second maximum value detectors;

an adder which adds the output signals of said third maximum value detector and the third minimum value detector;

an amplifier which amplifies the output signal of said adder by half amplification.

10. The device according to claim 8, wherein said detector of the horizontal direction nonlinear luminance signal includes:

first line delay device which delays the synthesis picture signal (CV) by one line period;

second line delay device which delays the output signal of said first line delay device by one line period;

first minimum value detector which selectively detects the smaller signal of both the output signal of said first line delay device and the nondelayed synthesis picture signal;

second minimum value detector which selectively detects the smaller signal of both the output signal of said first line delay device and the output signal of said second line delay device;

first maximum value detector which selectively detects the bigger signal of both the output signal of said first line delay device and the nondelayed synthesis picture signal;

second maximum value detector which selectively detects the bigger signal of both the output signal of said first line delay device and the output signal of the second line delay device;

third maximum value detector which selectively detects the bigger signal of two output signals coming out from said first and second minimum value detectors;

third minimum value detector which selectively detects the smaller signal of two output signals coming out from said first and second maximum value detectors;

an adder which adds the output signals of said third maximum value detector and the third minimum value detector; and an amplifier which amplifies the output signal of said adder by half amplification.

11. The device according to claim 8, wherein said color signal detector detects the color signal with a cascade of a band pass filter and a line comb-filter.

12. The device according to claim 8, wherein said control signal generator controls said multiplexer to select the luminance of the detector of the horizontal direction nonlinear luminance signal if the following equation (VII) is satisfactory:

$$K \cdot \text{Hdiff} < \text{Vdiff} \text{ and } \text{Hdiff} < TH1 \text{ and } \text{Vdiff} > TH2 \qquad \text{(VII)}$$

Where,

K is a constant and K>1,

Hdiff stands for $$(\text{HMAX}-\text{HMIN})-(\text{PHMIN}-\text{PHMAX})=\{(\text{MAX}(A1,A2,A3)-\text{MIN}(A1,A2,A3)\}-\{\text{MIN}(\text{MAX}(A1,A2),\text{MAX}(A2,A3)-\text{MAX}(\text{MIN}(A1,A2),\text{MIN}(A2,A3))\},$$

Vdiff stands for $$(\text{VMAX}-\text{VMIN})-(\text{PVMIN}-\text{PVMAX})=\{(\text{MAX}(A4,A2,A5)-\text{MIN}(A4,A2,A5)\}-\{\text{MIN}(\text{MAX}(A4,A2),\text{MAX}(A2,A5)-\text{MAX}(\text{MIN}(A4,A2),\text{MIN}(A2,A5))\},$$

TH1 and TH2 are the threshold values assigned in advance,

MAX(,) stands for the bigger value of two values,

MIN(,) stands for the smaller value of two values.

13. The device according to claim 8, wherein said control signal generator controls the multiplexer to select the luminance signal of the detector of the vertical direction nonlinear luminance signal if the following equation (IX) is satisfactory:

$$K \cdot \text{Vdiff} < \text{Hdiff} \text{ and } \text{Vdiff} < TH1 \text{ and } \text{Hdiff} > TH2 \qquad \text{(IX)}$$

Where,

K is a constant and K>1,

Hdiff stands for $$(\text{HMAX}-\text{HMIN})-(\text{PHMIN}-\text{PHMAX})=\{(\text{MAX}(A1,A2,A3)-\text{MIN}(A1,A2,A3)\}-\{\text{MIN}(\text{MAX}(A1,A2),\text{MAX}(A2,A3)-\text{MAX}(\text{MIN}(A1,A2),\text{MIN}(A2,A3))\},$$

Vdiff stands for $$(\text{VMAX}-\text{VMIN})-(\text{PVMIN}-\text{PVMAX})=\{(\text{MAX}(A4,A2,A5)-\text{MIN}(A4,A2,A5)\}-\{\text{MIN}(\text{MAX}(A4,A2),\text{MAX}(A2,A5)-\text{MAX}(\text{MIN}(A4,A2),\text{MIN}(A2,A5))\},$$

TH1 and TH2 are the threshold values assigned in advance,

MAX(,) stands for the bigger value of two values,

MIN(,) stands fop the smaller value of two values.

14. The device according to claim 8, wherein said control signal generator controls a the multiplexer to select the luminance signal of the subtractor if the following equations (X) and (XI) are not satisfactory:

$$K \cdot Hdiff < Vdiff \text{ and } Hdiff < TH1 \text{ and } Vdiff > TH2 \quad (X)$$

$$K \cdot Vdiff < Hdiff \text{ and } Vdiff < TH1 \text{ and } Hdiff > TH2 \quad (XI)$$

Where,

K is a constant and K>1,

Hdiff stands for $$(HMAX-HMIN)-(PHMIN-PHMAX)=\{(MAX(A1,A2,A3)-MIN(A1,A2,A3)\}- \{(MIN(MAX(A1,A2),MAX(A2,A3)-MAX(MIN(A1,A2),MIN(A2,A3))\},$$

Vdiff stands for $$(VMAX-VMIN)-(PVMIN-PVMAX)=\{(MAX(A4,A2,A5)-MIN(A4,A2,A5)\}- \{MIN(MAX(A4,A2),MAX(A2,A5)-MAX(MIN(A4,A2),MIN(A2,A5))\},$$

TH1 and TH2 are the threshold values assigned in advance,

MAX(,) stands for the bigger value of two values,

MIN(,) stands for the smaller value of two values.

15. A luminance and color signal isolation device, comprising:

a detector of a horizontal nonlinear luminance signal which is detecting a luminance signal from a synthesis picture signal as an input without having any change to horizontal direction; said detector of the horizontal direction nonlinear luminance signal detecting the luminance signal (Yph) using the following equation:

$$Yph=\{MAX(MIN(A1,A2),MIN(A2,A3))+MIN(MAX(A1,A2),MAX(A2,A3))\}/2$$

where,

MAX(,)=the bigger value of two values;

MIN(,)=the smaller value of two values; and

A1,A2,A3=the synthesis signals, and A2 is the basis, A1 is ahead of by two sample period, A3 is delayed by two sample period;

a detector of a vertical nonlinear luminance signal which is detecting the luminance signal with the synthesis picture signal as an input without having any change to vertical direction;

a color signal detector which is detecting a color signal from the synthesis picture signal;

a delay device which is delaying the synthesis picture signal for a certain time in order to be in synchronism with the output signal of the color signal detector;

a subtractor which is subtracting an output signal of the color signal detector from the output signal of the delay device;

a control signal generator which is both detecting any change of the synthesis picture signal in both the vertical direction or horizontal direction and generating control signals of CS11 and CS12; and a multiplexer which is alternatively selecting one of the luminance signal among the output signals from said subtractor, said detector of vertical nonlinear luminance signal, and said detector of horizontal nonlinear luminance signal using the control signals of CS11 and CS12 as the input signals from the control signal generator.

* * * * *